United States Patent
Ramamurthy et al.

(10) Patent No.: US 10,439,507 B2
(45) Date of Patent: Oct. 8, 2019

(54) POWER MODULES WITH PROGRAMMED VIRTUAL RESISTANCE

(71) Applicant: GE Energy Power Conversion Technology Ltd, Rugby, Warwickshire (GB)

(72) Inventors: Shyam Sunder Ramamurthy, Pittsburgh, PA (US); Christopher Joseph Lee, Pittsburgh, PA (US); Luke Anthony Solomon, Pittsburgh, PA (US)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 0 days.

(21) Appl. No.: 14/945,450

(22) Filed: Nov. 19, 2015

(65) Prior Publication Data
US 2017/0149350 A1 May 25, 2017

(51) Int. Cl.
| | |
|---|---|
| *H02M 7/04* | (2006.01) |
| *H02M 1/08* | (2006.01) |
| *H02M 1/00* | (2006.01) |
| *H02M 1/12* | (2006.01) |
| *H02M 7/12* | (2006.01) |
| *H02M 7/493* | (2007.01) |

(52) U.S. Cl.
CPC .............. *H02M 7/04* (2013.01); *H02M 1/08* (2013.01); *H02M 1/12* (2013.01); *H02M 7/12* (2013.01); *H02M 7/493* (2013.01); *H02M 2001/0025* (2013.01); *H02M 2001/0048* (2013.01)

(58) Field of Classification Search
CPC .. H02M 7/04; H02M 1/08; H02M 2001/0048; H02M 1/084; H02M 2001/007; H02M 2001/0074; H02M 2001/008; H02M 7/49; H02M 7/08; H02M 7/17; H02M 7/23; H02J 1/10
See application file for complete search history.

(56) References Cited

U.S. PATENT DOCUMENTS

| | | | |
|---|---|---|---|
| 8,295,063 B2 * | 10/2012 | Gong | H02M 1/12 363/40 |
| 2004/0201283 A1 | 10/2004 | Pai et al. | |
| 2008/0018279 A1 * | 1/2008 | Fukamizu | H02P 6/182 318/432 |

(Continued)

FOREIGN PATENT DOCUMENTS

| | | |
|---|---|---|
| WO | 2015/108614 A1 | 7/2015 |
| WO | 2015/155183 A1 | 10/2015 |

OTHER PUBLICATIONS

Wang et al., "Virtual-Impedance-Based Control for Voltage-Source and Current-Source Converters," IEEE Transactions on Power Electronics (2013).

(Continued)

*Primary Examiner* — Gustavo A Rosario-Benitez
(74) *Attorney, Agent, or Firm* — Wood IP LLC (57) ABSTRACT

A method, apparatus, and system to control a multi-phase converter having at least one power channel with a plurality of power modules, and involves detecting the voltage and the current of the power modules, calculating a command voltage based on a product of a programmed virtual resistance and the detected current, and transmitting a command voltage signal to the power modules based on the calculated command voltage.

14 Claims, 6 Drawing Sheets

(56) References Cited

U.S. PATENT DOCUMENTS

| | | | |
|---|---|---|---|
| 2008/0048606 A1* | 2/2008 | Tobari | H02P 21/16 |
| | | | 318/801 |
| 2013/0193899 A1* | 8/2013 | Kurosawa | H02P 6/182 |
| | | | 318/504 |
| 2014/0062354 A1* | 3/2014 | Choi | H02M 5/4585 |
| | | | 318/400.3 |
| 2014/0152110 A1* | 6/2014 | Sugimoto | H02J 4/00 |
| | | | 307/66 |
| 2014/0160818 A1 | 6/2014 | Garces et al. | |
| 2014/0368043 A1* | 12/2014 | Colombi | H02J 9/062 |
| | | | 307/66 |
| 2015/0236634 A1* | 8/2015 | Han | H02K 11/0073 |
| | | | 318/504 |
| 2016/0006338 A1* | 1/2016 | Sakimoto | H02M 7/53875 |
| | | | 363/131 |
| 2016/0156291 A1* | 6/2016 | Becker | H02M 7/68 |
| | | | 318/400.26 |
| 2016/0248253 A1* | 8/2016 | Zimmanck | H02J 3/382 |

OTHER PUBLICATIONS

Dahono., "A Control Method to Damp Oscillation in the Input LC Filter of AC-DC PWM Converters," IEEE 33rd Annual Conference on Power Electronics Specialists, vol. 4, pp. 1630-1635 (Jun. 23-27, 2002).

International Search Report and Written Opinion issued in connection with corresponding PCT Application No. PCT/EP2016/078129 dated Mar. 20, 2017.

* cited by examiner

POWER MODULES WITH PROGRAMMED VIRTUAL RESISTANCE

TECHNICAL FIELD

Embodiments relate to a method, apparatus, and system to increase the apparent resistance of power modules in power converters so as to de-couple the performance of these power converters from bridge losses, bridge errors, and compensation errors, and also to mitigate the effects of transient interactions between and within power converters that are closely coupled to an AC source.

BACKGROUND

In electronic power supply systems having multi-level drive configuration with level balancing action, errors are introduced in the voltage realized at the output due to several factors. Such factors, for example, may include a mis-match in dc levels which are induced by the dynamics of a balancing action of the series capacitors in a multi-level design and by lags in the sampling of the dc voltage levels, modulator transition between voltage levels, and dead-time during switching of the power module.

To mitigate such dead-time distortion during switching, dead-time compensation is used. The dead-time compensation, however, must be guarded against the feasibility of adding dc components. Moreover, in a transformer-less configuration, operating in solidly grounded electronic power supply systems, the common mode dc components in the system require high resistance to ground in order to prevent circulation of dc components.

DRAWINGS

The various advantages of the embodiments will become apparent to one skilled in the art by reading the following specification and appended claims, and by referencing the following drawings, in which:

DESCRIPTION OF EMBODIMENTS

In accordance with embodiments, a method, apparatus, and system is provided to increase the apparent resistance of power modules of a power converter in a manner which de-couples the power converter from bridge losses, bridge errors, and compensation errors, and also to mitigate the effects of transient interactions between and within power converters that are closely coupled to a power source, such as, for example, an AC source.

A power module refers to the switching element within a power converter that realizes the voltage commanded by the control system. A power module is connected to a phase arm and may be arranged into single or multiple parallel power channels to form the power converter.

Figure 1:
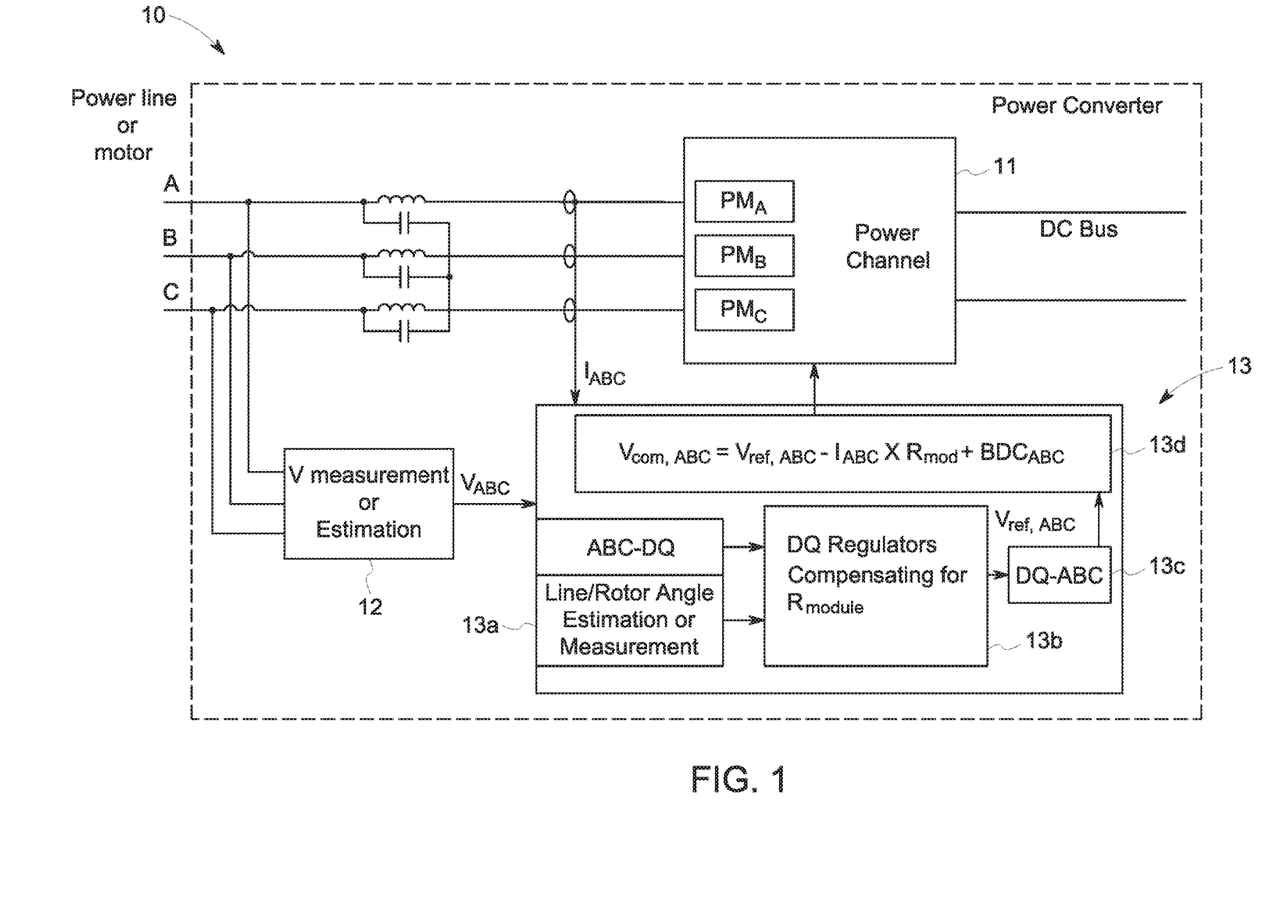
FIG. 1 illustrates a control system for a single power channel power converter arrangement with Power Modules (PM) including virtual resistance effect, in accordance with embodiments.

FIG. 1 illustrates a circuit diagram of a multi-phase power converter 10, such as, for example, a three-phase converter having a plurality of power modules assembled into a single power channel 11, operatively connected to a power source or motor having phase voltages $V_{ABC}$ and phase currents $I_{ABC}$ which flow to the power channel 11 of the converter 10. The power converter 10 may include a sensor 12 or electronic device to detect or measure the phase voltages $V_{ABC}$ and phase currents $I_{ABC}$ may be operatively connected between the power channel 11 and a controller 13 to control the operation of the converter 10 based upon the detected or measured phase voltages $V_{ABC}$ and phase currents $I_{ABC}$ which are received as signals from the sensor 12. Alternatively, in accordance with embodiments, the controller 13 may be operatively connected to a sensor 12 located outside of the housing of the controller 13.

As illustrated in FIG. 1, in accordance with embodiments, the controller 13 may include one or more control blocks 13a-13d.

For example, control block 13a may, upon a detection (i.e., sensing or estimation) of the voltage $V_{ABC}$ at the terminals and the current $I_{ABC}$ of each phase arm connected to a corresponding power module $PM_A$, $PM_B$, $PM_C$ of the power channel 11 (or receive a signal representing the same), transform coordinates of the detected voltage $V_{ABC}$ and the detected current $I_{ABC}$ into DQ reference coordinates. Control block 13a may additionally estimate or measure a power line or a rotor angle based on the detection using a phase locked loop (PLL), flux observer, zero crossing detection, or other methods.

Control block 13b may implement DQ regulators compensating for a programmed virtual resistance $R_{mod}$ to calculate the reference output voltage $V_{ref,\ ABC}$ in the DQ coordinate frame.

Control block 13c may transform, based on the line or the rotor angle, the DQ reference coordinate into coordinates of the reference output voltage $V_{ref,\ ABC}$.

Control block 13d may then calculate a command voltage $V_{com,\ ABC}$ to be transmitted to the power modules $PM_A$, $PM_B$, $PM_C$ of the power channel 11. The calculation of the command voltage $V_{com\ ABC}$ may be based on a plurality of control factors, such as, for example, the reference output voltage $V_{ref,\ ABC}$ for each phase arm of the converter 10, a bridge drop compensation $BDC_{ABC}$ based on the detected current $I_{ABC}$ of each phase arm of the power channel 11, and a product of a programmed virtual resistance $R_{mod}$ and the detected current $I_{ABC}$. In particular, the command voltage $V_{com\ ABC}$ may be calculated using the following formula:

$$V_{com,\ ABC} = V_{ref,\ ABC} - (I_{ABC} \times R_{mod}) + BDC_{ABC}$$

In accordance with embodiments, the programmed virtual resistance $R_{mod}$ module is considered in the control scheme. The converter 10 compensates for this resistance as a feed-forward in the DQ reference frame. Before the reference output voltage $V_{ref,\ ABC}$ is utilized by the modulators individual phase power modules, the product of current $I_{ABC}$ and the programmed virtual resistance $R_{mod}$ module is subtracted from the reference output voltage $V_{ref,\ ABC}$. An advantage that may be realized through embodiments when the sampling frequency is high, which would be the case in converters having high switching frequency and small filters. In converters with low sampling frequency, current prediction techniques may be used to enhance the control scheme in accordance with embodiments.

Figure 2:
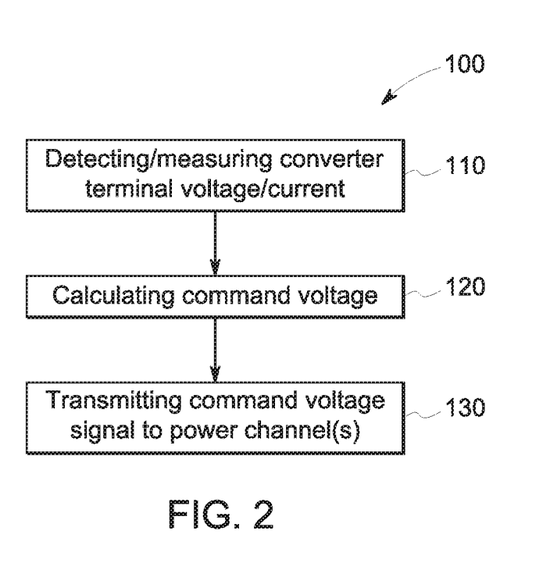
FIG. 2 illustrates a flow chart of a method of controlling the power converter arrangement of FIG. 1, in accordance with embodiments.

FIG. 2 illustrates a method 100 of controlling a converter having three-phases in accordance with embodiments. The method 100 may be implemented as a set of logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 100 may be written in any combination of one or more programming languages, including an object oriented programming language such as Java, Smalltalk, C++ or the like and conventional procedural programming languages, such as the "C" programming language or similar programming languages.

Illustrated processing block 110 involves detecting or measuring the voltages $V_{ABC}$ and the currents $I_{ABC}$ which flow to each phase arm connected to a corresponding one of power modules $PM_A$, $PM_B$, $PM_C$ of the channel 11. Alternatively, the voltages $V_{ABC}$ and the currents $I_{ABC}$ may be estimated.

Illustrated processing block 120 involves calculating a command voltage $V_{com,\ ABC}$ based on at least one of a reference output voltage $V_{ref,\ ABC}$ for each power module $PM_A$, $PM_B$, $PM_C$, a bridge drop compensation $BDC_{ABC}$ based on the detected current $I_{ABC}$ of each power module $PM_A$, $PM_B$, $PM_C$, and a product of a programmed virtual resistance $R_{mod}$ and the detected current $I_{ABC}$. Such a calculation may include, for example, calculating the reference output voltage $V_{ref,\ ABC}$ in a DQ reference frame for each power module $PM_A$, $PM_B$, $PM_C$ while taking into consideration a voltage drop due to a fundamental current across the programmed virtual resistance. In accordance with embodiments, calculation(s) of processing block 120, for example, may be performed in accordance with at least one of the control blocks 13a-13d noted herein.

Illustrated processing block 130 involves supplying a command voltage signal to each phase arm of the power converter 10 based on the calculated command voltage $V_{com,\ ABC}$.

Figure 3:
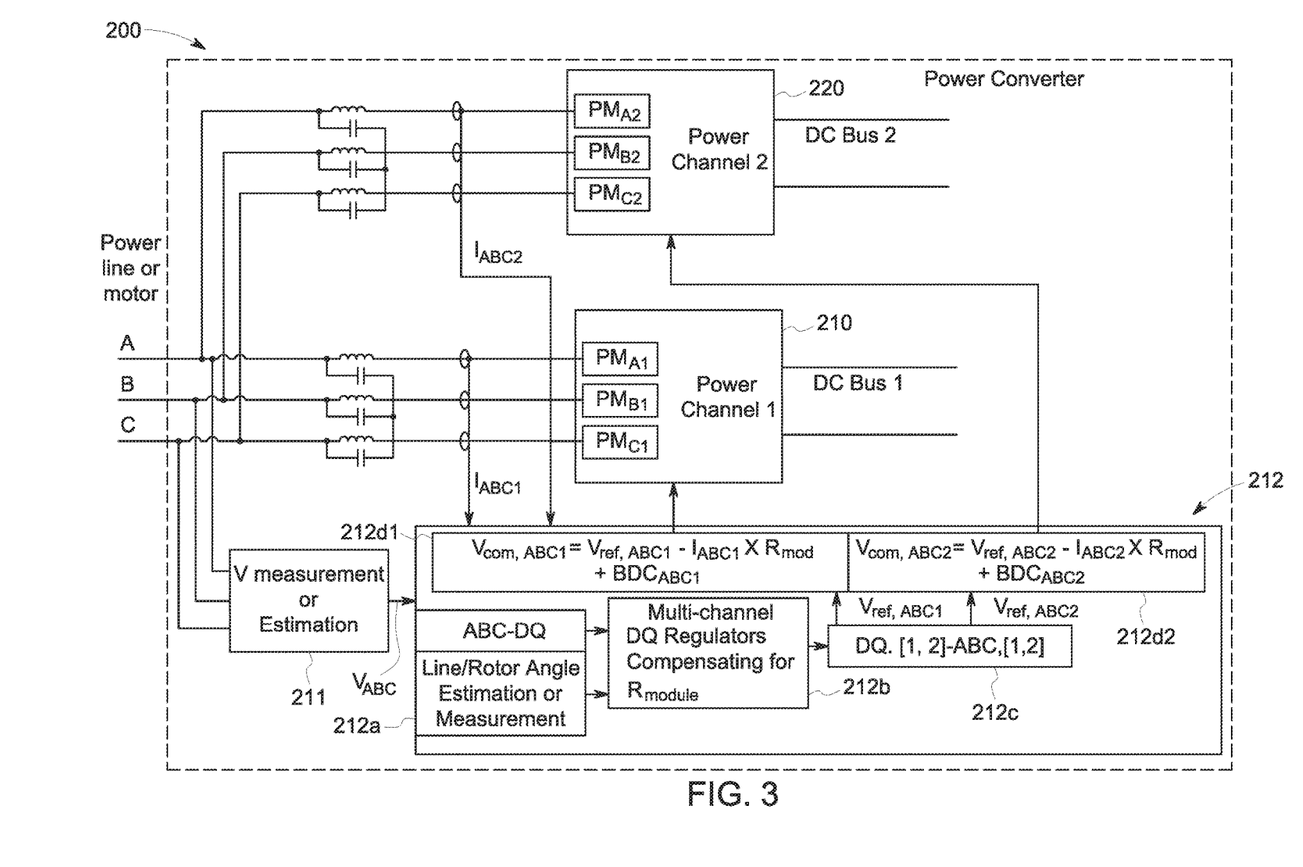
FIG. 3 illustrates a control system for multi-power channel power converter arrangement with Power Modules (PM) including virtual resistance effect, in accordance with embodiments.

FIG. 3 illustrates a circuit diagram of a control scheme for a power converter 200 having a pair of power channels, 210, 220 such as, for example, a three-phase converter 200 having a plurality of power modules assembled into a pair of parallel power channels 210, 220 and operating into a common power source or motor. The control scheme involves phase voltages $V_{ABC1}$, $V_{ABC2}$ at the terminals of the power channels 210, 220 terminals and phase currents $I_{ABC1}$, $I_{ABC2}$ which flow to the power modules $PM_{A1}$, $PM_{B1}$, $PM_{C1}$ of the first power channel 210 and the power modules $PM_{A2}$, $PM_{B2}$, $PM_{C2}$ of the second power channel 220.

In accordance with embodiments, the power converter 200 may include a sensor 211 or device to detect or measure the phase voltages $V_{ABC}$ at the terminal of the power channels 210, 220 and the phase currents $I_{ABC1}$, $I_{ABC2}$ at the phase arm of the power channels 210, 220 may be operatively connected between each power channel 210, 220, and a controller 212 is to control the operation of each power channel 210, 220 based upon the detected or measured phase voltage $V_{ABC}$ and the phase currents $I_{ABC1}$, $I_{ABC2}$ which are received as signals from the sensor 211. Alternatively, in accordance with embodiments, the controller 212 may be operatively connected to a sensor 211 located outside of the housing of the controller 212.

As illustrated in FIG. 3, in accordance with embodiments, the controller 212 may include one or more control blocks 212a-212d.

For example, control block 212a may, upon a detection of the converter terminal voltage and the current of each phase arm of the power channels 210, 220 (or receive a signal representing the same), transform coordinates of the detected voltage $V_{ABC}$ into DQ reference coordinates. Control block 212a may additionally estimate or measure a power line or a rotor angle based on the detection using a phase locked loop (PLL), flux observer, zero crossing detection or other methods.

Control block 212b may implement DQ regulators calculating the DQ references for each of the parallel power channels 210, 220 while compensating for a programmed virtual resistance $R_{mod}$.

Control block 212c may transform, based on the line or the rotor angle the $DQ_{1,\ 2}$ reference coordinate into coordinates of the reference output voltage $V_{ref,\ ABC1}$, $V_{ref,\ ABC2}$.

Control blocks $212d_1$, $212d_2$ may then calculate a command voltage $V_{com,\ ABC1}$, $V_{com,\ ABC2}$ to be transmitted to a respective one of the power channels 210, 220. The calculation of the command voltage $V_{com,\ ABC1}$, $V_{com,\ ABC2}$ may be based on a plurality of control factors, such as, for example, the reference output voltage $V_{ref,\ ABC}$, $V_{ref,\ ABC2}$ for each phase arm of the power channels 210, 220, a bridge drop compensation $BDC_{ABC1}$, $BDC_{ABC2}$ based on the detected current $I_{ABC1}$, $I_{ABC2}$ of each phase arm of the power channels 210, 220 and a product of a programmed virtual resistance $R_{mod}$ and the detected current $I_{ABC1}$, $I_{ABC2}$. In particular, the command voltage $V_{com1}$, $V_{com2}$ to each, respective power channel 210, 220 may be calculated using the following formulas:

$$V_{com,\ ABC1} = V_{ref,\ ABC1} - (I_{ABC1} \times R_{mod}) + BDC_{ABC1}$$

$$V_{com,\ ABC2} = V_{ref,\ ABC2} - (I_{ABC2} \times R_{mod}) + BDC_{ABC2}$$

In accordance with embodiments, the programmed virtual resistance $R_{mod}$ module is considered in the control scheme. The power channels 210, 220 compensate for this resistance as a feed-forward in the DQ reference frame. Before the reference output voltage $V_{ref,\ ABC1}$, $V_{ref,\ ABC2}$ is utilized by the modulators individual phase power modules, the product of current $I_{ABC1}$, $I_{ABC2}$ and the programmed virtual resistance $R_{mod}$ module is subtracted from the reference output voltage $V_{ref,\ ABC1}$, $V_{ref,\ ABC2}$.

Figure 4:
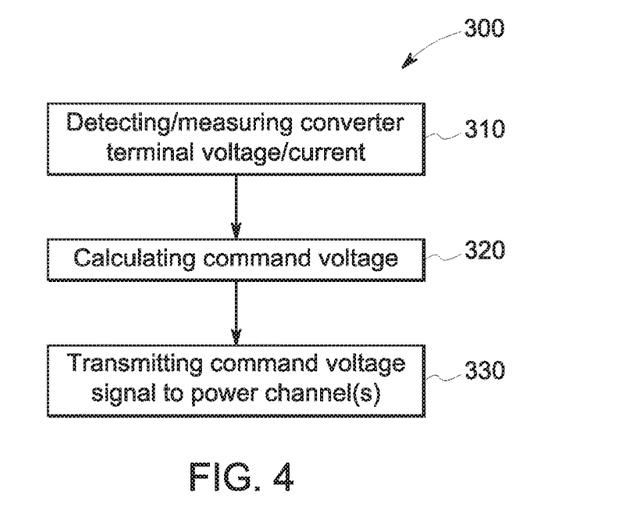
FIG. 4 illustrates a flow chart of a method of controlling the power converter arrangement of FIG. 3, in accordance with embodiments.

FIG. 4 illustrates a method 300 of controlling a converter having three-phases in accordance with embodiments. The method 300 may be implemented as a set of logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 300 may be written in any combination of one or more programming languages, including an object oriented programming language such as Java, Smalltalk, C++ or the like and conventional procedural programming languages, such as the "C" programming language or similar programming languages.

Illustrated processing block 310 involves detecting or measuring the voltage $V_{ABC}$ and the currents $I_{ABC1}$, $I_{ABC2}$ which flow to each phase arm connected to a corresponding one of power modules $PM_A$, $PM_B$, $PM_C$ of the power channels 210, 220. Alternatively, the voltage $V_{ABC}$ and the currents $I_{ABC1}$, $I_{ABC2}$ may be estimated.

Illustrated processing block 320 involves calculating a command voltage based on at least one of a reference output voltage $V_{ref, ABC1}$, $V_{ref, ABC2}$ for each power module $PM_A$, $PM_B$, $PM_C$, a bridge drop compensation $BDC_{ABC1}$, $BDC_{ABC2}$ based on the detected current $I_{ABC1}$, $I_{ABC2}$ of each power module $PM_A$, $PM_B$, $PM_C$, and a product of a programmed virtual resistance $R_{mod}$ and the detected current $I_{ABC1}$, $I_{ABC2}$. Such a calculation may include, for example, calculating the reference output voltage $V_{ref, ABC}$ in a DQ reference frame for each power module $PM_{A1}$, $PM_{B1}$, $PM_{C1}$, $PM_{A2}$, $PM_{B2}$, $PM_{C2}$ while taking into consideration a voltage drop due to a fundamental current across the programmed virtual resistance $R_{mod}$. In accordance with embodiments, calculation(s) of processing block 320, for example, may be performed in accordance with at least one of the control blocks 212a-212d noted herein.

Illustrated processing block 212d1, 212d2 involves supplying a command voltage signal to each phase arm of the converter 210, 220 based on the calculated command voltage $V_{com1}$, $V_{com2}$.

As illustrated in FIGS. 5(a) and 5(b) and 6(a) and 6(b), the graphs qualitatively illustrate the influence of this scheme when the programmed virtual resistance is 100% (100% resistance limits the current to 100% when 100% system voltage is applied).

Figure 5A:
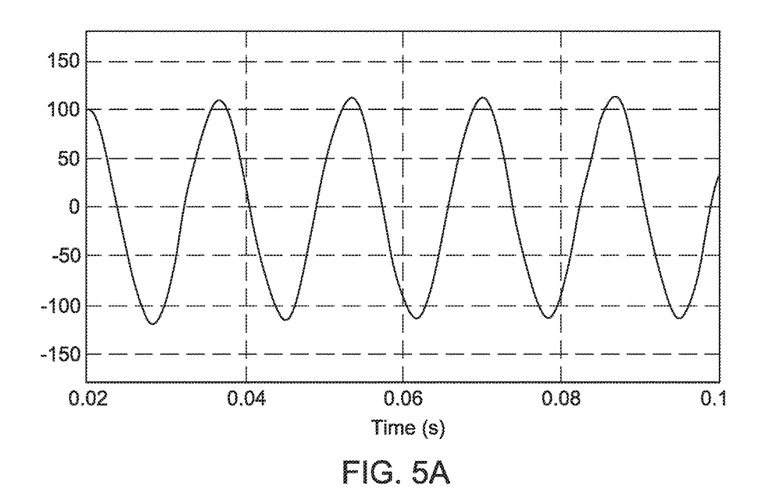
FIGS. 5a and 5b illustrate a graph of a system response of the control scheme, in accordance with embodiments.
Figure 5B:
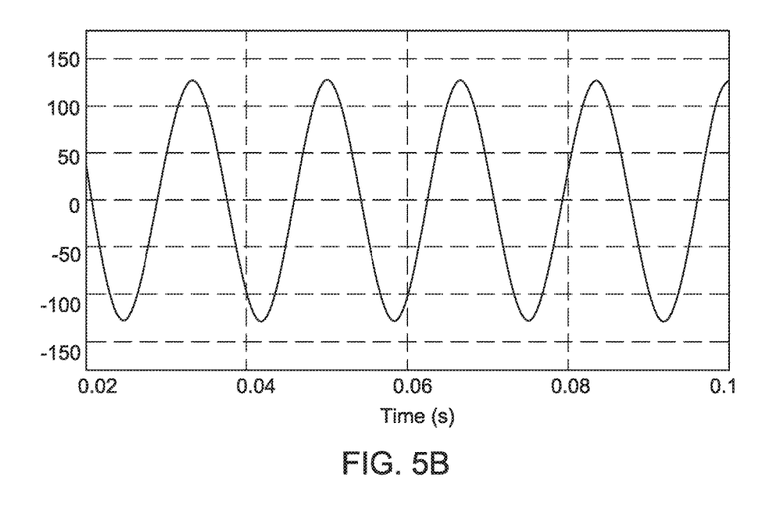

As illustrated in FIG. 5(a), for a 0.5% 5th harmonic component in the bridge voltage output due to dead-time voltage loss, a 5% (at fundamental frequency) filter impedance will result in an harmonic current circulation of 0.5%/(5×5%)=2%. With the virtual resistance, the harmonic current would be limited to 0.5% (FIG. 5(b)).

Figure 6A:
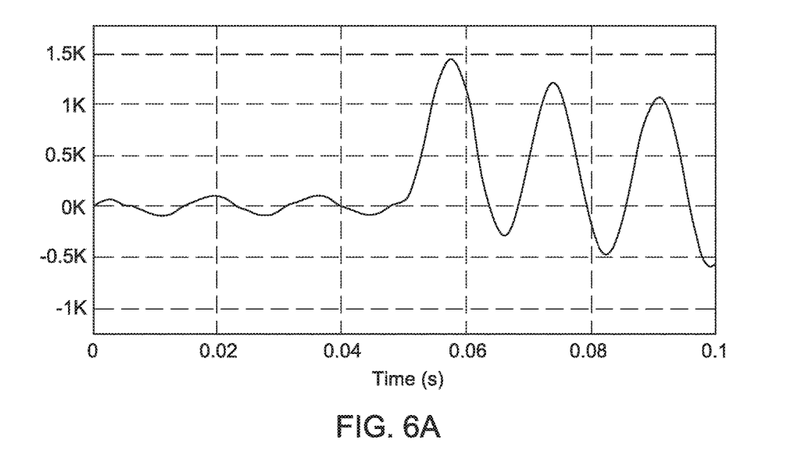
FIGS. 6a and 6b illustrate a graph of a system response of the control scheme, in accordance with embodiments.
Figure 6B:
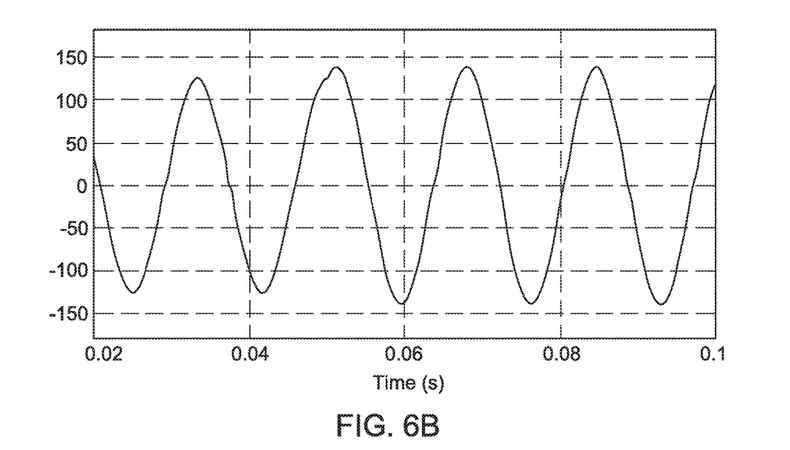

As illustrated in FIG. 6(a), for a sudden transient deviation in power line voltage by 10%, the prospective current deviation would be more than 10%/5%=200% if the DQ controller does not do any action, but with the virtual resistance, the current deviation would be naturally limited to about 2% (FIG. 6(b).

For power converters with parallel power channels operating into an AC source or a motor, the virtual resistance would also make the impedance of each converter path for any current deviation much higher than the impedance of the AC source or the motor, thereby reducing effects of transient interactions and resonances and provides damping to these phenomena.

The method, apparatus, and system in accordance with embodiments sets forth a power converter scheme that establishes an apparent low impedance network for the current (impedance notch) which the converter controller intends to establish. For any current deviating from this intended current due to external or internal phenomena, the power converter will offer a higher resistance equal to the programmed virtual resistance.

In accordance with embodiments, a multi-phase power converter implementation is provided in which a voltage reference for each power module is computed as the voltage reference from the power converter controller minus the product of the sampled instantaneous current flowing through the power module times a constant. The constant is set as a parameter in the power converter and communicated to the power module. The power converter controller computes the output reference output voltage using dq rotating frame control techniques, but compensates for the voltage drop due to this constant assuming it as purely resistive. In addition, precise control of currents in d and q frames is attained with zero steady state errors due to the action of the conventional compensators.

Embodiments are to apply a resistance equation at the instantaneous phase current in each phase, and thus, makes the programmed resistance effective for all components and sequences of the waveform (including dc, negative sequence and all harmonics).

Additional Notes and Examples

Example One may include a method of controlling a multi-phase converter having at least one power channel with a plurality of power modules, the method comprising: detecting the voltage and the current of the power modules; calculating a command voltage based on a product of a programmed virtual resistance and the detected current; and transmitting a command voltage signal to the power modules based on the calculated command voltage.

Example Two may include the method of Example One, wherein calculating the command voltage comprises calculating a reference output voltage in a DQ reference frame for the power modules based upon a voltage drop due to a fundamental current across the programmed virtual resistance.

Example Three may include the method of Example Two, wherein calculating the command voltage comprises subtracting the product of the programmed virtual resistance and the detected current from the reference output voltage.

Example Four may include the method of Example Three, wherein calculating the command voltage comprises adding a bridge drop compensation to the reference output voltage.

Example Five may include the method of Example One, wherein calculating the command voltage comprises transforming coordinates of the detected voltage into DQ reference coordinates.

Example Six may include the method of Example Five, wherein calculating the command voltage comprises: estimating a power line or a rotor angle based on the measurements or estimation using phase locked loop (PLL), flux observer and zero crossing detection; and transforming, based on the estimated power line or the rotor angle, the DQ reference coordinate into coordinates of the reference output voltage.

Example Seven may include an apparatus for controlling a multi-phase converter having at least one power channel with a plurality of power modules, the apparatus comprising: logic, at least partially comprising hardware configured to: detect the voltage and the current of the power modules; calculating a command voltage based on a product of a programmed virtual resistance and the detected current; and transmit a command voltage signal to the power modules based on the calculated command voltage.

Example Eight may include the method of Example Seven, wherein the logic is configured to calculate the command voltage by calculating a reference output voltage in a DQ reference frame for the power modules based upon a voltage drop due to a fundamental current across the programmed virtual resistance.

Example Nine may include the method of Example Eight, wherein the logic is configured to calculate the command voltage by subtracting the product of the programmed virtual resistance and the detected current from the reference output voltage.

Example Ten may include the method of Example Nine, wherein the logic is configured to calculate the command voltage by adding a bridge drop compensation to the reference output voltage.

Example Eleven may include the method of Example Seven, wherein the logic is configured to calculate the command voltage by transforming coordinates of the detected voltage into DQ reference coordinates.

Example Twelve may include the method of Example Eleven, wherein the logic is configured to calculate the command voltage by: estimating a power line or a rotor angle based on a measurement or estimation using phase locked loop, flux observer and zero crossing detection; and transforming, based on the estimated power line or the rotor angle, the DQ reference coordinate into coordinates of the reference output voltage.

Example Thirteen may include the method of Example Seven, wherein the at least one power channel comprises parallel power channels.

Example Fourteen may include a system, comprising: a multi-phase converter having at least one power channel with a plurality of power modules; and a controller to control operation of the multi-phase converter, the controller having logic, at least partially comprising hardware configured to: detect the voltage and the current of the power modules; calculate a command voltage based on a product of a programmed virtual resistance and the detected current; and transmit a command voltage signal to each power module based on the calculated command voltage.

Example Fifteen may include the system of Example Fourteen, wherein the logic is configured to calculate the command voltage by calculating a reference output voltage in a DQ reference frame for the power modules based upon a voltage drop due to a fundamental current across the programmed virtual resistance.

Example Sixteen may include the system of Example Fifteen, wherein the logic is configured to calculate the command voltage by subtracting the product of the programmed virtual resistance and the detected current from the reference output voltage.

Example Seventeen may include the system of Example Sixteen, wherein the logic is configured to calculate the command voltage by adding a bridge drop compensation to the reference output voltage.

Example Eighteen may include the system of Example Fourteen, wherein the logic is configured to calculate the command voltage by transforming coordinates of the detected voltage into DQ reference coordinates.

Example Nineteen may include the system of Example Eighteen, wherein the logic is configured to calculate the command voltage by: estimating a power line or a rotor angle based on a measurement or estimation using phase locked loop, flux observer and zero crossing detection; and transforming, based on the estimated power line or the rotor angle, the DQ reference coordinate into coordinates of the reference output voltage.

Example Twenty may include the system of Example Fourteen, wherein the at least one power channel comprises parallel power channels.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A method of controlling a multi-phase converter having at least one power channel with a plurality of power modules, the method comprising:

detecting a voltage and a current of each phase arm connected to the power modules;

transforming coordinates of the detected voltage and the detected current into DQ reference coordinates;

measuring a rotor angle of a motor based on the detection;

compensating, via DQ regulators, for a programmed virtual resistance for calculating a reference output voltage in DQ reference coordinates for the power modules; and transforming, based on the rotor angle, the DQ reference coordinates of the reference output voltage into coordinates of the reference output voltage;

calculating a command voltage to be transmitted to the power modules of the power channel based on the detected current of each phase arm of the multi-phase power converter, a bridge drop compensation based on the detected current of each phase arm and a product of the programmed virtual resistance and the detected current; and transmitting a command voltage signal to the power modules based on the calculated command voltage.

2. The method of claim 1, wherein calculating the command voltage comprises calculating the reference output voltage in a DQ reference frame for the power modules based upon a voltage drop due to a fundamental current across the programmed virtual resistance.

3. The method of claim 2, wherein calculating the command voltage comprises subtracting the product of the programmed virtual resistance and the detected current from the reference output voltage.

4. The method of claim 3, wherein calculating the command voltage comprises adding a bridge drop compensation to the reference output voltage.

5. An apparatus for controlling a multi-phase converter having at least one power channel with a plurality of power modules, the apparatus comprising:

logic, at least partially comprising hardware configured to:

detect a voltage and a current of each phase arm connected to the power modules;

transform coordinates of the detected voltage and the detected current into DQ reference coordinates;

measure a rotor angle of a motor based on the detection;

compensate, via DQ regulators, for a programmed virtual resistance for calculating a reference output voltage in DQ reference coordinates for the power modules;

transform, based on the rotor angle, the DQ reference coordinates of the reference output voltage into coordinates of the reference output voltage;

calculate a command voltage to be transmitted to the power modules of the power channel based on the detected current of each phase arm of the multi-phase power converter, a bridge drop compensation based on the detected current of each phase arm and a product of the programmed virtual resistance and the detected current; and transmit a command voltage signal to the power modules based on the calculated command voltage.

6. The apparatus of claim 5, wherein the logic is configured to calculate the command voltage by calculating the reference output voltage in a DQ reference frame for the power modules based upon a voltage drop due to a fundamental current across the programmed virtual resistance.

7. The apparatus of claim 6, wherein the logic is configured to calculate the command voltage by subtracting the product of the programmed virtual resistance and the detected current from the reference output voltage.

8. The apparatus of claim 7, wherein the logic is configured to calculate the command voltage by adding a bridge drop compensation to the reference output voltage.

9. The apparatus of claim 5, wherein the at least one power channel comprises parallel power channels.

10. A system, comprising:
a multi-phase converter having at least one power channel with a plurality of power modules; and
a controller to control operation of the multi-phase converter, the controller having logic, at least partially comprising hardware configured to:
detect a voltage and a current of each phase arm connected to the power modules;
transform coordinates of the detected voltage and the detected current into DQ reference coordinates;
measure a rotor angle of a motor based on the detection;
compensate, via DQ regulators, for a programmed virtual resistance for calculating a reference output voltage in DQ reference coordinates for the power modules;
transform, based on the rotor angle, the DQ reference coordinates of the reference output voltage into coordinates of the reference output voltage;
calculate a command voltage to be transmitted to the power modules of the power channel based on the detected current of each phase arm of the multi-phase power converter, a bridge drop compensation based on the detected current of each phase arm and a product of the programmed virtual resistance and the detected current; and
transmit a command voltage signal to the power modules based on the calculated command voltage.

11. The system of claim 10, wherein the logic is configured to calculate the command voltage by calculating the reference output voltage in a DQ reference frame for the power modules based upon a voltage drop due to a fundamental current across the programmed virtual resistance.

12. The system of claim 11, wherein the logic is configured to calculate the command voltage by subtracting the product of the programmed virtual resistance and the detected current from the reference output voltage.

13. The system of claim 12, wherein the logic is configured to calculate the command voltage by adding a bridge drop compensation to the reference output voltage.

14. The system of claim 10, wherein the at least one power channel comprises parallel power channels.

* * * * *